United States Patent
Chuang et al.

(10) Patent No.: US 7,641,378 B2
(45) Date of Patent: Jan. 5, 2010

(54) LIQUID CRYSTAL DISPLAY AND BACKLIGHT MODULE THEREOF

(75) Inventors: Yung-Pin Chuang, Hsinchu (TW); Szu-Han Li, Hsinchu (TW); Ching-Fu Tien, Hsinchu (TW); Keng-Ju Lin, Hsinchu (TW); Cheng-Hua Tien, Hsinchu (TW); Tsung-Hsien Hsieh, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 6 days.

(21) Appl. No.: 11/565,629

(22) Filed: Dec. 1, 2006

(65) Prior Publication Data
US 2008/0080211 A1    Apr. 3, 2008

(30) Foreign Application Priority Data
Oct. 3, 2006    (TW) .............................. 95136697 A

(51) Int. Cl.
    *F21V 7/04* (2006.01)
(52) U.S. Cl. ..................... 362/633; 362/634; 362/632
(58) Field of Classification Search ............. 349/61–71; 362/632–634, 600, 623–625, 609
See application file for complete search history.

(56) References Cited

U.S. PATENT DOCUMENTS

| | | | |
|---|---|---|---|
| 6,490,016 B1 * | 12/2002 | Koura | 349/58 |
| 6,962,430 B2 * | 11/2005 | Ito et al. | 362/634 |
| 2001/0026336 A1 * | 10/2001 | Yano | 349/63 |
| 2003/0189821 A1 | 10/2003 | Moon | |
| 2005/0018416 A1 * | 1/2005 | Amaya | 362/31 |
| 2005/0099790 A1 * | 5/2005 | Kang et al. | 362/31 |
| 2007/0035950 A1 * | 2/2007 | Yang | 362/294 |

FOREIGN PATENT DOCUMENTS

| | | |
|---|---|---|
| CN | 1371018 | 9/2002 |
| CN | 1776501 | 5/2006 |
| CN | 1779516 | 5/2006 |
| JP | 2005-327720 | 11/2005 |
| JP | 2006-114447 | 4/2006 |
| KR | 1020010007584 | 1/2001 |
| KR | 1020040019140 | 3/2004 |
| KR | 1020060032345 | 4/2006 |

* cited by examiner

*Primary Examiner*—Jong-Suk (James) Lee
*Assistant Examiner*—Julie A Shallenberger
(74) *Attorney, Agent, or Firm*—Jianq Chyun IP Office

(57) ABSTRACT

A backlight module including a first frame, a light guide plate, and a light source is provided. The inner surface of the first frame has at least a first reflection area. In addition, the light guide plate is disposed in the first frame and located beside the first reflection area, and the light guide plate has a light incident surface. Moreover, the light source is disposed in the first frame and between the first reflection area and the light incident surface. The first reflection area is suitable for reflecting a part of the light emitted from the light source to the light incident surface. A liquid crystal display using the backlight module is also provided.

22 Claims, 2 Drawing Sheets

US 7,641,378 B2

LIQUID CRYSTAL DISPLAY AND BACKLIGHT MODULE THEREOF

CROSS-REFERENCE TO RELATED APPLICATION

This application claims the priority benefit of Taiwan application serial no. 95136697, filed on Oct. 3, 2006. All disclosure of the Taiwan application is incorporated herein by reference.

BACKGROUND OF THE INVENTION

1. Field of the Invention

The present invention relates to a liquid crystal display. More particularly, the present invention relates to a backlight module for a liquid crystal display.

2. Description of Related Art

A common liquid crystal display usually includes a component with color display function, such as a liquid crystal display panel. As the liquid crystal display panel does not emit light, a backlight module must be disposed below the liquid crystal display panel to serve as a light source to illuminate the liquid crystal display panel for displaying images.

FIG. 1 is a schematic sectional view of a conventional backlight module. Referring to FIG. 1, the conventional backlight module 100 includes a first frame 110, a second frame 120, a light source 130, a lampshade 132, a light guide plate 140, a reflector 150, and a diffuser film 160. The light source 130 and the lampshade 132 are disposed in the first frame 110, and the light guide plate 140 is disposed beside the light source 130. In particular, a part of the light L emitted from the light source 130 enters the light guide plate 140 after being reflected by the lampshade 132.

In addition, the reflector 150 is disposed at the bottom of the light guide plate 140, and the diffuser sheet 160 is disposed at the top of the light guide plate 140. In detail, the light that enters the light guide plate 140 is reflected by the reflector 150, and emits out through the diffuser film 160, so as to provide a uniform light source to the liquid crystal display panel (not shown). It should be noted that the lampshade 132 is generally made of a metal material, which not only more expensive, but also is heavy. Especially when a large-size backlight module 100 is assembled or is reworked, the lampshade 132 consumes the much time of the process, which adversely impacts the production throughput.

SUMMARY OF THE INVENTION

The present invention is directed to a backlight module, for solving the problem of high manufacturing cost.

The present invention is directed to a liquid crystal display including the aforementioned backlight module so as to improve the display quality and reduce the manufacturing cost of the liquid crystal display.

To achieve the aforementioned or other purposes, the present invention provides a backlight module, which comprises a first frame, a light guide plate, and a light source. The inner surface of the first frame has at least a first reflection area. In addition, the light guide plate is disposed in the first frame and is located adjacent to the first reflection area, and the light guide plate has a light incident surface. Moreover, the light source is disposed in the first frame and between the first reflection area and the light incident surface. The first reflection area is suitable for reflecting the light emitted from the light source to the light incident surface.

In an embodiment of the present invention, a material of the first frame comprises a high reflectivity material.

In an embodiment of the present invention, the material of the first frame comprises a metal material with high-reflectivity painting or coating, a plastic material added with high-reflectivity particles, a sheet material of high reflectivity, or the like.

In an embodiment of the present invention, the first frame comprises at least a first positioning portion located at the edge of the first reflection area for positioning the light guide plate.

In an embodiment of the present invention, the backlight module further comprises a second frame disposed on the first frame. The second frame has an opening to expose the light guide plate, and the inner surface of the second frame has at least a second reflection area. The second reflection area and the first reflection area are suitable for reflecting the light emitted from the light source to the light incident surface.

In an embodiment of the present invention, the second frame comprises at least a second positioning portion located at the edge of the second reflection area for positioning the light guide plate.

In an embodiment of the present invention, the backlight module further comprises an optical film disposed on the first reflection area of the first frame and the second reflection area of the second frame.

In an embodiment of the present invention, the optical film comprises at least one of a reflector, a brightness enhancement film, and a prism sheet.

In an embodiment of the present invention, the backlight module further comprises a positioning metal piece disposed between the first reflection area of the first frame and the optical film.

In an embodiment of the present invention, the second frame comprises a retaining recess, and the positioning metal piece extends into the retaining recess, so as to position the first frame and the second frame.

In an embodiment of the present invention, a material of the second frame comprises a high reflectivity material.

In an embodiment of the present invention, the material of the second frame comprises a metal material with high-reflectivity painting or coating, a plastic material added with high-reflectivity particles, a sheet material of high reflectivity, or the like.

In an embodiment of the present invention, the backlight module further comprises an optical film set disposed above the light guide plate.

In an embodiment of the present invention, the optical film set comprises at least one of a reflector, a brightness enhancement film, and a prism sheet.

In an embodiment of the present invention, the backlight module further comprises a reflector disposed at the bottom of the light guide plate.

The present invention provides a liquid crystal display which comprises the aforementioned backlight module and a liquid crystal display panel, wherein the liquid crystal display panel is disposed above the light guide plate.

The first frame of the backlight module of the present invention is made of a high-reflectivity material, and the first reflection area of the first frame effectively reflects a part of the light emitted from the light source to the light guide plate. Therefore, the backlight module of the present invention can effectively reflect the light without using a lampshade. Thus, the manufacturing cost is reduced, and the assembly time is also reduced. The first frame and the second frame of the backlight module of the present invention can also be assembled together to further improve the reliability of the backlight module. The second frame of the present invention has the second reflection area which effectively reflects a part of the light emitted from the light source to the light guide plate, thus further improving the reuse rate of the light, such that the liquid crystal display has good display quality.

In order to make the aforementioned and other purposes, features and advantages of the present invention comprehensible, preferred embodiments accompanied with figures are described in detail below.

DESCRIPTION OF EMBODIMENTS

The First Embodiment

Figure 2:
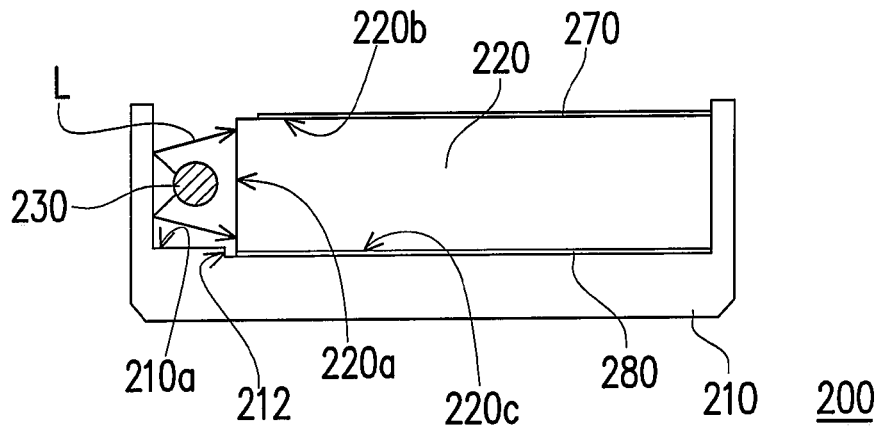
FIG. 2 is a schematic sectional view of a backlight module according to a first embodiment of the present invention.

FIG. 2 is a schematic sectional view of the backlight module of the first embodiment of the present invention. Referring to FIG. 2, the backlight module 200 of the present invention includes a first frame 210, a light guide plate 220, and a light source 230. The inner surface of the first frame 210 has at least a first reflection area 210a, and the position of the first reflection area 210a corresponds to the position of the light source 230. It should be noted that the first frame 210 of the present invention can be comprised of a high temperature resistant material of high reflectivity, for example, a metal material with high-reflectivity painting or coating, a plastic material added with high-reflectivity particles, a sheet material of high reflectivity, or the like. In other words, because the first frame 210 of the present invention can withstand the high temperature so that it will not get deformed even when the temperature of the backlight module 200 is very high after a long time use.

In addition, the light guide plate 220 is disposed in the first frame 210 and is located beside to the first reflection area 210a. Generally speaking, the light guide plate 220 includes a light incident surface 220a, a light emitted surface 220b, and a light diffusion surface 220c. In detail, a part of the light L emitted from the light source 230 enters the light guide plate 220 through the light incident surface 220a after being reflected by the first reflection area 210a. Thereafter, the light is diffused by the light diffusion surface 220c. Finally the light emits out through the light emitted surface 220b.

According to another aspect of the present invention, in order to firmly position the light guide plate 220 in the first frame 210, the first frame 210 of the present invention includes at least a first positioning portion 212. The first positioning portion 212 is located at the edge of the first reflection area 210a, so as to position the light guide plate 220. It should be noted that the first positioning portion 212 of FIG. 2 comprises a stair-case structure, however the shape of the first positioning portion 212 may be properly modified according to different requirements, and is not limited herein.

Figure 1:
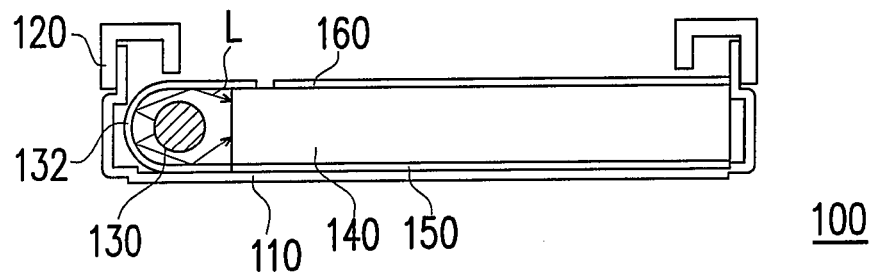
FIG. 1 is a schematic sectional view of a conventional backlight module.

Moreover, the light source 230 is disposed in the first frame 210 and between the first reflection area 210a and the light incident surface 220a. The light source 230 may be a cold cathode fluorescent lamp (CCFL) or a light-emitting diode (LED). If the CCFL is used as the light source 230, as the light L emitted from the CCFL has a slight direction concentration, a part of the light L emitted towards the inner surface of the first frame 210 may enter the light guide plate 220 through the light incident surface 220a after being reflected by the first reflection area 210a, and thus the application rate of the light L is improved effectively. The backlight module 200 of the present invention reflects light by using the first frame 210 made of a high-reflectivity material, and does not need the conventional lampshade 132 (as shown in FIG. 1). Compared with the conventional backlight module 100 (as shown in FIG. 1), the backlight module 200 of the present invention includes fewer components, so the weight and the manufacturing cost of the backlight module 200 are reduced effectively. Furthermore, the time for assembling or reworking the backlight module 200 of the present invention can be effectively reduced as well.

To further improve the optical display quality of the backlight module 200, the backlight module 200 of the present invention further includes an optical film set 270 disposed above the light guide plate 220. Moreover, the backlight module 200 of the present invention further includes a reflector 280 disposed at the bottom of the light guide plate 220. The optical film set 270 of the present invention includes at least a diffuser film, a brightness enhancement film (BEF), and a prism sheet, or a combination thereof. The diffuser film can diffuse the light emitted from the light source 220 more uniformly, the BEF enhances the brightness of the backlight module 200, and the prism sheet improves the correctness of the light exit direction.

The Second Embodiment

Figure 3:
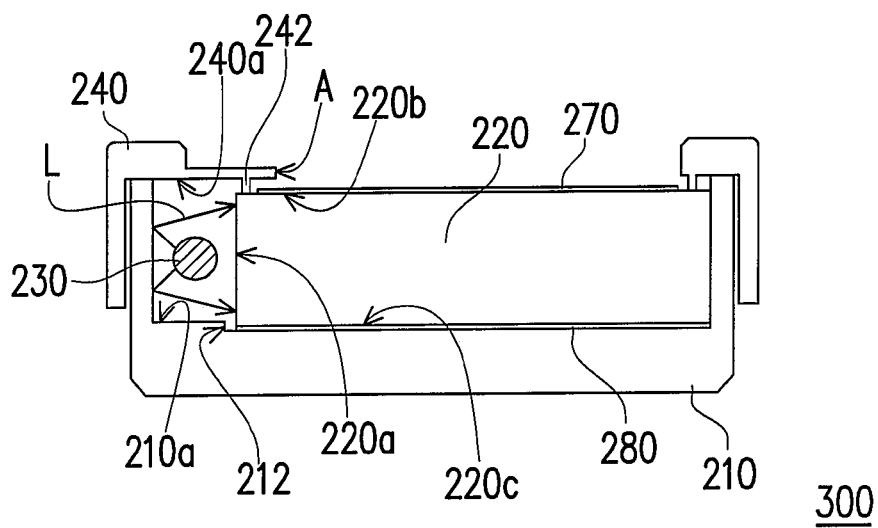
FIG. 3 is a schematic sectional view of a backlight module according to a second embodiment of the present invention.

The second embodiment is similar to the first embodiment, while the difference mainly lies in that the backlight module 300 (as shown in FIG. 3) of the present invention further includes a second frame 240. To further improve the reliability of the backlight module 300, the second frame 240 of the present invention is disposed on the first frame 210, and the second frame 240 has an opening A to expose the light guide plate 220. It should be noted that the material of the second frame 240 and the first frame 210 of the present invention can be comprised of a high temperature resistant material of high reflectivity, for example, a metal material with high-reflectivity painting or coating, a plastic material added with high-reflectivity particles, a sheet material of high reflectivity, or the like. Moreover, the inner surface of the second frame 240 has at least a second reflection area 240a.

It should be noted that the second reflection area 240a and the first reflection area 210a are suitable for reflecting a part of the light emitted from the light source 230 to the light incident surface 220a. In practice, the position of the second reflection area 240a corresponds to that of the light source 230. It is known clearly from FIG. 3 that the second frame 240 of the present invention has at least a second positioning portion 242 located at the edge of the second reflection area 240a. The second positioning portion 242 is against the light guide plate 220, so as to position the light guide plate 220.

Figure 4:
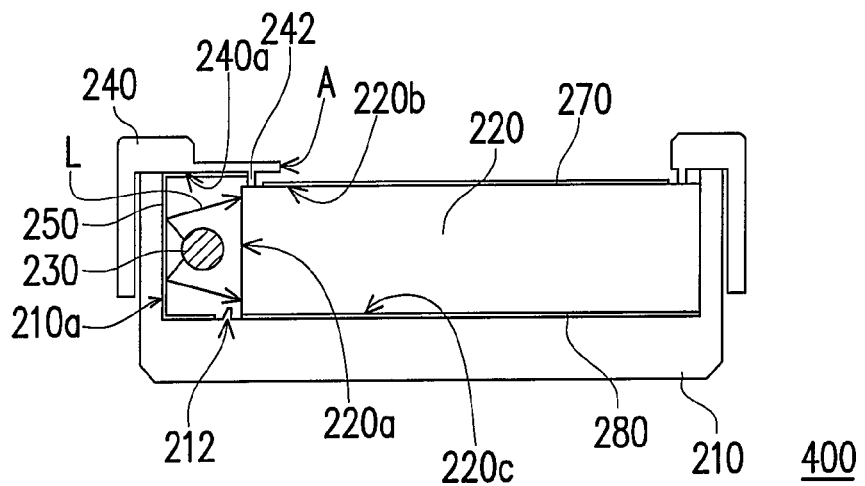
FIG. 4 is a schematic view of an optical film of the second embodiment according to an embodiment of the present invention.

Moreover, the backlight module 400 (as shown in FIG. 4) of the present invention further includes an optical film 250, and the optical film 250 is disposed on the first reflection area 210a of the first frame 210 and the second reflection area 240a of the second frame 240. The optical film 250 includes at least a reflector, a BEF, and a prism sheet, or a combination thereof, so as to further improve the reuse rate of the light source 230.

The Third Embodiment

Figure 5:
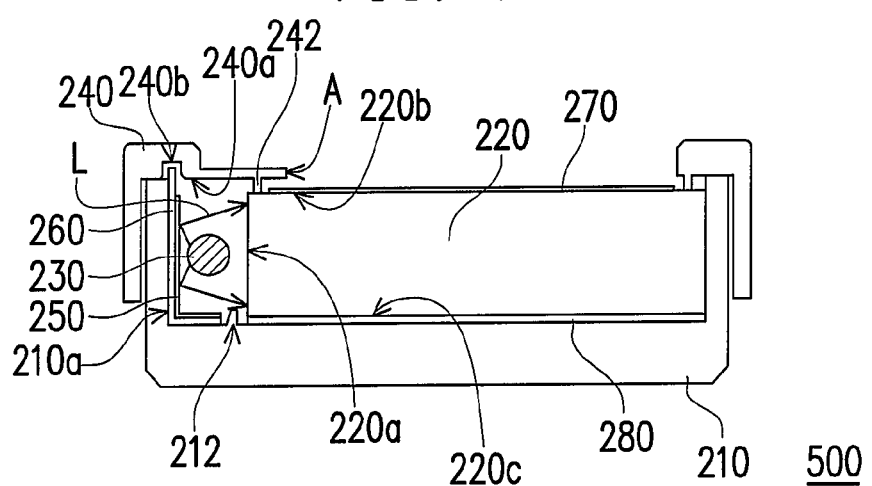
FIG. 5 is a schematic sectional view of the backlight module according to a third embodiment of the present invention.

The third embodiment is closely similar to the second embodiment, while the difference mainly lies in that the backlight module 500 (as shown in FIG. 5) of the present invention further includes a positioning metal piece 260, and the second frame 240 has a retaining recess 240b. The positioning metal piece 260 of the present invention is disposed between the first reflection area 210a of the first frame 210 and the optical film 250, and the positioning metal piece 260 extends into the retaining recess 240b, so as to position the second frame 240 and the first frame 210. The positioning metal piece 260 is made of a high-reflectivity material, and the surface of the positioning metal piece 260 is polished to further improve the reflection effect for the light source 230.

The Fourth Embodiment

Figure 6:
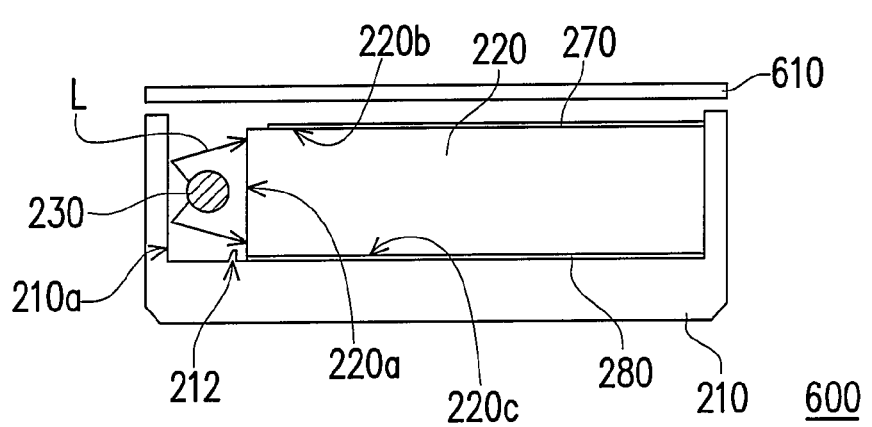
FIG. 6 is a schematic view of the liquid crystal display according to a fourth embodiment of the present invention.

FIG. 6 is a schematic view of the liquid crystal display of the fourth embodiment of the present invention. Referring to FIG. 6, the liquid crystal display 600 of the present invention includes the aforementioned backlight module 200 and a liquid crystal display panel 610. The structure of the backlight module 200 has been clearly disclosed in the first embodiment, and the liquid crystal display panel 610 is disposed above the light guide plate 220. The liquid crystal display panel 610 of the present invention together with the backlight module 300, 400, or 500 can form a liquid crystal display. Here, the structures of the backlight modules 300, 400, and 500 have been clearly disclosed in the first and the second embodiment. By using the backlight module 200, 300, 400, or 500 of the present invention, the liquid crystal display of the present invention has the advantages of light weight, less time required for assembling and reworking, low manufacturing cost, and good optical display characteristic.

To sum up, the first frame of the backlight module of the present invention is made of a high-reflectivity material, and the first reflection area of the first frame effectively reflects a part of the light emitted from the light source to the light guide plate. Therefore, the backlight module of the present invention can effectively reflect a part of the light emitted from the light source to the light guide plate without using the lampshade. Thus, the backlight module of the present invention provides an area light source with high luminance, such that the liquid crystal display of the present invention has favorable optical display characteristic. Moreover, as the backlight module of the present invention uses fewer components, the backlight module of the present invention has the advantages of light weight, low manufacturing cost, and short assembly time, and the working hours for reworking are effectively reduced as well. The second frame of the present invention is made of a high reflectivity material, and the first frame and the second frame can be assembled together. Thus, the reliability of the entire backlight module and the reuse rate of the light are further improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A backlight module, comprising:
a first frame, comprising at least a first reflection area on an inner surface thereof;
a light guide plate, disposed in the first frame and located beside to the first reflection area, wherein the light guide plate has a light incident surface;
a light source, disposed in the first frame and between the first reflection area and the light incident surface;
a positioning metal piece, disposed on the first reflection area of the first frame, wherein the positioning metal piece is adopted for reflecting the light emitted from the light source to the light incident surface; and
a second frame, disposed on the first frame, wherein the second frame comprises:
an opening to expose the light guide plate, wherein an inner surface of the second frame comprises at least a second reflection area, and the second reflection area is adopted for reflecting the light emitted from the light source to the light incident surface; and
a retaining recess, wherein the positioning metal piece extends into the retaining recess, so as to position the first frame and the second frame.

2. The backlight module of claim 1, wherein the material of the first frame comprises a high reflectivity material.

3. The backlight module of claim 1, wherein the first frame has at least a first positioning portion located at an edge of the first reflection area for positioning the light guide plate.

4. The backlight module of claim 1, wherein the second frame comprises at least a second positioning portion located at an edge of the second reflection area for positioning the light guide plate.

5. The backlight module of claim 1, further comprising an optical film disposed on the first reflection area of the first frame and the second reflection area of the second frame.

6. The backlight module of claim 5, wherein the optical film comprises at least a reflector, a brightness enhancement film or a prism sheet, or a combination thereof.

7. The backlight module of claim 5, wherein the positioning metal piece is disposed between the first reflection area of the first frame and the optical film.

8. The backlight module of claim 1, wherein the material of the second frame comprises a high reflectivity material.

9. The backlight module of claim 1, further comprising an optical film set disposed above the light guide plate.

10. The backlight module of claim 9, wherein the optical film set at least comprises a diffuser film, a prism sheet or a brightness enhancement film, or a combination thereof.

11. The backlight module of claim 1, further comprising a reflector disposed at a bottom of the light guide plate.

12. A liquid crystal display, comprising:
a backlight module, comprising:
a first frame, comprising at least a first reflection area on an inner surface thereof;
a light guide plate, disposed in the first frame and located beside to the first reflection area, wherein the light guide plate has a light incident surface;
a light source, disposed in the first frame and between the first reflection area and the light incident surface;
a positioning metal piece, disposed on the first reflection area of the first frame, wherein the positioning metal piece is adopted for reflecting the light emitted from the light source to the light incident surface; and
a second frame, disposed on the first frame, wherein the second frame comprises:
an opening to expose the light guide plate, wherein an inner surface of the second frame comprises at least a second reflection area, and the second reflection area is adopted for reflecting the light emitted from the light source to the light incident surface; and a retaining recess, wherein the positioning metal piece extends into the retaining recess, so as to position the first frame and the second frame; and a liquid crystal panel, disposed above the light guide plate.

13. The liquid crystal display of claim 12, wherein the material of the first frame comprises a high reflectivity material.

14. The liquid crystal display of claim 12, wherein the first frame has at least a first positioning portion located at an edge of the first reflection area for positioning the light guide plate.

15. The liquid crystal display of claim 12, wherein the second frame has at least a second positioning portion located at an edge of the second reflection area for positioning the light guide plate.

16. The liquid crystal display of claim 12, further comprising an optical film disposed on the first reflection area of the first frame and the second reflection area of the second frame.

17. The liquid crystal display of claim 16, wherein the optical film comprises at least a reflector, a brightness enhancement film or a prism sheet, or a combination thereof.

18. The liquid crystal display of claim 16, wherein the positioning metal piece is disposed between the first reflection area of the first frame and the optical film.

19. The liquid crystal display of claim 12, wherein the material of the second frame comprises a high reflectivity material.

20. The liquid crystal display of claim 12, further comprising an optical film set disposed above the light guide plate.

21. The liquid crystal display of claim 20, wherein the optical film set at least comprises a diffuser film, a prism sheet or a brightness enhancement film, or a combination thereof.

22. The liquid crystal display of claim 12, further comprising a reflector disposed at a bottom of the light guide plate.

* * * * *